United States Patent

[11] 3,569,637

[72] Inventor Harold Esten
Willingboro, N.J.
[21] Appl. No. 767,929
[22] Filed Oct. 14, 1968
[45] Patented Mar. 9, 1971
[73] Assignee RCA Corporation

[54] GAS ENVIRONMENT FOR RECORDER-REPRODUCER SYSTEMS
13 Claims, 1 Drawing Fig.

[52] U.S. Cl. .......... 179/100.2, 340/174.1
[51] Int. Cl. .......... G11b 5/00, G11b 1/00, G11b 5/10
[50] Field of Search .......... 179/100.2, 100.2 (P), 100.2 (C); 340/174.1 (E)

[56] References Cited
UNITED STATES PATENTS
3,380,043 4/1968 Carroll .......... 179/100.2X

*Primary Examiner*—Bernard Konick
*Assistant Examiner*—Raymond F. Cardillo, Jr.
*Attorney*—Edward J. Norton

ABSTRACT: A technique is disclosed for minimizing undesirable frictional effects at the transducer-record medium interface of a recorder-reproducer system. The recorder-reproducer system is provided at the transducer-record medium interface with a gaseous environment with adsorptive properties which exceed those of water vapor. The adsorptive properties of the gas result in a sufficient adsorption of the gas at the record medium to produce and sustain, upon desorption at the transducer-record medium interface, a friction reducing effect.

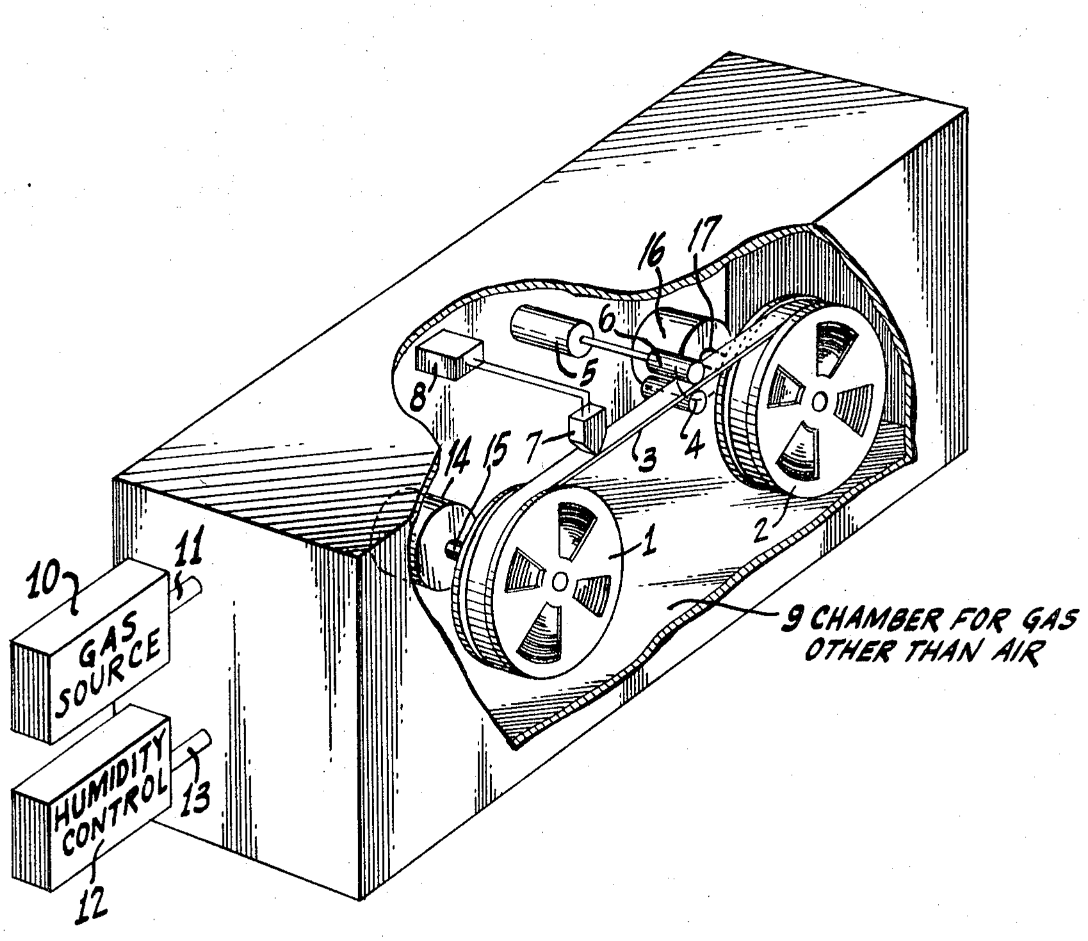
INVENTOR
HAROLD ESTEN
BY Edward J Norton
ATTORNEY

GAS ENVIRONMENT FOR RECORDER-REPRODUCER SYSTEMS

This invention relates to improved stability and wear reduction in a recorder-reproducer system. More particularly it concerns minimizing frictional effects at the transducer-record medium interface, by provision of a gaseous environment at the interface with adsorptive properties which exceed those of water vapor.

In a tape recorder-reproducer system, the record medium-transducer interface is a key element in the successful operation of the recorder. It is at this specific area where recording of the information on the record medium and reproduction of the signals takes place. In many recorders, in particular data and video recorders, the transducer and record medium are in pressured contact. Thus the operating environment of such a recorder, is one where there are two different materials moving relative to one another and in intimate mechanical contact. A common problem, which has been experienced in such a situation, is excessive transducer head-to-tape medium friction. This results in erosion of the transducer head and/or record medium and hence loss of desired recording performance. This friction which accompanies the wear process at the interface, can cause a portion of the record medium materials to accumulate on the transducer head recording surface. This buildup leads to stick-slip motion between the transducer and the record medium. This stick-slip motion causes flutter of the record medium, which introduces errors and distortion in the record-reproduce process. Eventually the stick-slip condition can become so severe, that the torque capacity of the transport becomes saturated with the record medium stuck to the transducer head.

It is therefore an object of the present invention to minimize wear and reduce susceptance to stick-slip motion at the transducer-record medium interface in a recorder.

According to the principles of the present invention at least the transducer-record medium interface of a recorder exists in an atmospheric environment which includes a gas whose product of specific surface energy of adsorption and amount which is adsorbed is greater than that of water vapor.

The sole FIGURE of the drawing is a simplified, perspective view of a tape recorder-reproducer embodying the present invention.

The continuous relative motion between the transducer and record medium generates frictional heating, which it is believed tends to desorb the record medium surface of its absorbed moisture or water vapor. The process of desorption cools the interface much like evaporative cooling. If sufficient time exists for the record medium surface to repair itself between successive passes, the record medium is not greatly degraded. That is, if sufficient time exists for the record medium to readsorb moisture and return to its original condition. However, when time between passes of the record medium are insufficient for appreciable readsorption, successive passes of the record medium result in a dryer record medium, and hence less cooling during desorption. Eventually the record medium becomes sufficiently dry, as to permit the asperities of the record medium and transducer in frictional contact, to generate sufficient heat to cause softening of the record medium material. This softening greatly increases the actual contact area of the record medium and transducer. The total friction is thus increased and the transducer-record medium interface is more susceptible to stick-slip operation.

If reference is made to the drawing, there is shown a simplified, illustrative embodiment of a recorder-reproducer system suitable for the practice of the present invention. The drawing shows a supply reel 1 and a takeup reel 2 both rotatably mounted by any suitable means, not shown. The supply reel 1 is driven by means of a motor 14 which is coupled to the reel 1 by a shaft 15. The takeup reel 2 is driven by means of a motor 16 which is coupled to the reel 2 by a shaft 17. A record medium 3 is secured at one end to the takeup reel 2 and at its other end to the supply reel 1. The record medium 3 is preferably a type of conventional magnetic oxide coated plastic recording tape. A capstan 4 which is driven by a motor 5 and a pinch roller 6, provides along with the motors 14 and 16 a means for transferring the record medium 3 from the supply reel 1 to the takeup reel 2. A transducer 7 is arranged in contacting relation with the record medium 3, for recording and reproducing signals from the record medium 3. A signal processor 8 is coupled to the transducer 7, to provide proper signal transformation to and from the transducer 7. The recorder-reproducer system is enclosed by a gas chamber 9 which is capable of being filled with a gas other than air. A gas source 10 is coupled to the chamber 9 by the tubing 11. A humidity control means 12 is also coupled to the chamber 9 by the tubing 13. For the sake of simplicity and clarity only one simplified embodiment of a record-reproduce system has been shown in the drawing. However, it is to be understood that the recorder assembly may in practice take any known form of complexity and sophistication in accordance with the application thereof. Thus, motor servocontrol loops, moveable head mechanisms and other known techniques not shown in the drawing may be employed in practicing the invention.

When the recorder system is operated, the chamber 9 is filled from gas source 10 with a gas whose product of specific surface energy of adsorption and amount which is adsorbed is appreciably greater than that of water vapor. The theory and operation of such gas characteristics are discussed in several texts, including "Electron Emission and Adsorption Phenomena" by DeBoer. Operating the recorder system in an atmospheric environment of a gas with the above-stated properties, results in increased adsorption of gas at the record medium with a greater potential for producing a cooling effect during desorption. At the transducer-record medium interface, the relative motion of the contacting elements produces heating which desorbs the gas from the record medium. This desorption is like an evaporative cooling process which reduces the temperature rise experienced by the asperities of the transducer and record medium due to frictional heating effects. Because such a gas is susceptible to adsorption in greater quantity and has a higher specific energy of adsorption than say water vapor, the amount and duration of desorptive cooling at the record medium-tranducer interface is increased. Degradation of the record medium due to excessive dryness is thus minimized. A reduction in total friction and hence wear, between the record medium and transducer is effected. Correspondingly, the susceptibility of the system to stick-slip motion is reduced, which results in more uniform transfer of the record medium past the transducer. Several gases exist which have the characteristic that their product, of specific surface energy of adsorption and amount which is adsorbed, is greater than the same product for water vapor. However, for practical reasons it is preferable that the gas used should be relatively stable, nontoxic and one that will not attack or destroy the materials of the elements of the recorder system. Test results indicate that carbon dioxide ($CO_2$) and sulfur hexafluoride ($SF_6$) are suitable gases for practicing the invention. It has been observed that the invention is operable over a wide range of temperatures about room temperature. Although satisfactory results have been obtained with the gas in the chamber 9 at a pressure of 1 atmosphere (absolute), it is believed that additional advantages may be gained by increasing the gas pressure to greater than 1 atmosphere (absolute). In addition, it has been observed that it is preferable to have a low relative humidity or low water vapor content within the gas-filled chamber. Therefore as shown in FIG. 1, a humidity control means 12 is provided for keeping the relative humidity within the chamber 9 at a desired value. It is believed that the presence of humidity or water vapor within the gas-filled chamber results in the water vapor being adsorbed to the exclusion of a portion of the desired gas. This lessens the benefit that can be derived from the presence of the gas with the more desireable adsorptive characteristics specified. It has been found that a relative humidity of 4 percent or less within the chamber 9 is preferable.

The recorder system performance for air and for nitrogen ($N_2$) in the chamber 9, was compared with the performance with carbon dioxide ($CO_2$) gas in the chamber 9, at the same temperature, pressure and humidity. The pressure was approximately 1 atmosphere absolute with the temperature varied over a range from about 25° C. to 75° C. and the relative humidity varied over a range from less than 4 percent to about 75 percent. The record medium 3 used was RCA Magnetic Tape H 617. With carbon dioxide, the friction at the record medium-transducer interface appeared to be in the order of one-half the value for air or nitrogen, with an attendant order of magnitude of wear reduction. With carbon dioxide, the reduction in the magnitude of the stick-slip motion, as measured by an accelerometer attached to a resiliently mounted transducer was in the order of 10 times that with air or nitrogen.

It has also been found beneficial to provide a quantity of oxygen $O_2$ with the specified gas in the chamber 9. The oxygen enables replenishment of the oxide film of the record medium and transducer, which may eventually become somewhat depleted by operation of the recorder system over a period of time. It has been found for example, that a mixture of 80 percent carbon dioxide with 20 percent oxygen, or 80 percent sulfur hexafluoride with 20 percent oxygen is satisfactory.

I claim:

1. In a system including a magnetic record medium in contacting relation with a magnetic transducer, an apparatus for reducing the frictional relationship between said medium and said transducer, comprising:
 - a chamber which encloses at least the interface region of said transducer and said record medium; and
 - means for providing a gaseous atmosphere within said chamber, said gaseous atmosphere including a predominating gas whose product of specific energy of adsorption and amount which is adsorbed, exceeds such a product for water vapor.

2. The invention as claimed in claim 1, wherein the gas having the specified adsorptive property is carbon dioxide.

3. The invention as claimed in claim 1, wherein the gas having the specified adsorptive property is sulfur hexafluoride.

4. The invention as claimed in claim 1, means for providing said gas within said chamber at a pressure of at least one atmosphere of absolute pressure.

5. The invention as claimed in claim 1, further including means for controlling the amount of water vapor present within said chamber.

6. The invention as claimed in claim 5, the relative humidity within said chamber is not greater than 4 percent.

7. The invention as claimed in claim 1, wherein said gaseous atmosphere comprises a mixture of oxygen and a gas whose product of specified energy of adsorption and amount which is adsorbed, exceeds such a product for water vapor.

8. The invention as claimed in claim 7, wherein said mixture is 20 percent oxygen and 80 percent gas with the specified adsorptive properties.

9. In a recorder-reproducer system including a magnetic recording medium and a magnetic transducer, a method of enhancing system performance through reduction of frictional effects at the interface of said record medium and said transducer comprising moving said record medium past said transducer in operative contacting relation therewith, and providing a gaseous atmosphere which envelops at least the record medium-transducer interface portion of said recorder-reproducer system said gaseous atmosphere being substantially constituted of a gas whose product of specific surface energy of adsorption and amount which is adsorbed, is greater than such a product for water vapor.

10. The method of claim 9, wherein said gas is carbon dioxide.

11. The method of claim 9, wherein said gas is sulfur hexafluoride.

12. In combination:
 - a magnetic record medium;
 - means including a signal transducer in contacting relation with said record medium for recording signals on and reproducing signals from said record medium;
 - means for producing relative motion between said record medium and signal transducer; and
 - means for providing a gaseous environment for at least the region of contact between said signal transducer and said record medium, said gaseous environment being substantially comprised of a gas with the property that its product of specific energy of adsorption and amount which is adsorbed at said record medium exceeds such a product for water vapor.

13. The combination comprising: a signal transducer intended for use in contacting signal transducing relation with a record medium; means for providing a gaseous atmosphere at the interface region of said transducer and said record medium with said gaseous atmosphere being predominately a gas whose product of specific energy of adsorption and amount which is adsorbed, exceeds such a product for water vapor.